(12) United States Patent
Yokota et al.

(10) Patent No.: US 11,246,021 B2
(45) Date of Patent: Feb. 8, 2022

(54) ELECTRONIC CONTROL UNIT, ELECTRONIC CONTROL SYSTEM, AND RECORDING MEDIUM

(71) Applicant: PANASONIC INTELLECTUAL PROPERTY MANAGEMENT CO., LTD., Osaka (JP)

(72) Inventors: Kaoru Yokota, Hyogo (JP); Takayuki Fujii, Osaka (JP); Akihito Takeuchi, Osaka (JP); Kou Ishii, Osaka (JP); Minehisa Nagata, Osaka (JP); Toshihisa Nakano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/793,493

(22) Filed: Feb. 18, 2020

(65) Prior Publication Data
US 2020/0275247 A1    Aug. 27, 2020

(30) Foreign Application Priority Data
Feb. 22, 2019    (JP) .............................. JP2019-030809

(51) Int. Cl.
*H04W 4/48* (2018.01)
*H04L 12/40* (2006.01)

(52) U.S. Cl.
CPC .............. *H04W 4/48* (2018.02); *H04L 12/40* (2013.01); *H04L 2012/40215* (2013.01); *H04L 2012/40273* (2013.01)

(58) Field of Classification Search
CPC ........... H04L 2012/40215; H04L 63/00; H04L 2012/40273; H04L 12/40; H04W 4/48

USPC ........................................................ 709/224
See application file for complete search history.

(56) References Cited

U.S. PATENT DOCUMENTS

| | | | |
|---|---|---|---|
| 6,714,793 B1 * | 3/2004 | Carey ..................... | H04L 51/04 455/466 |
| 7,516,244 B2 * | 4/2009 | Kelly ................... | H04L 12/4625 370/252 |
| 10,050,965 B2 * | 8/2018 | Fredriksson .......... | H04L 63/123 |

(Continued)

OTHER PUBLICATIONS

Murvay et al., "Security Shortcomings and Countermeasures for the SAE J1939 Commercial Vehicle Bus Protocol", IEEE Transactions on Vehicular Technology, vol. 67, No. 5, May 2018, pp. 4325-4339.

*Primary Examiner* — Umar Cheema
*Assistant Examiner* — John Fan
(74) *Attorney, Agent, or Firm* — Greenblum & Bernstein, P.L.C.

(57) ABSTRACT

An electronic control unit includes: a first determination unit which determines whether a message received is an address claim message; a second determination unit which determines, when it is determined that the message received is an address claim message, whether a device name included in the address claim message received is a predetermined device name; and a third determination unit which performs a predefined determination process, when it is determined that the device name included in the address claim message received is the predetermined device name, and determine whether the address claim message received is an unauthorized message according to a result of the predefined determination process.

5 Claims, 17 Drawing Sheets

(56) References Cited

U.S. PATENT DOCUMENTS

2011/0009107 A1\* 1/2011 Guba ................. H04W 4/027
    455/418
2017/0120846 A1\* 5/2017 Gupta ................. H04W 4/023

\* cited by examiner

FIG. 11

| DN | State |
|---|---|
| Na | S2 |
| Nb | S0 |
| Nc | S2 |
| Nd | S1 |
| Ne | S1 |
| Nf | S2 |
| Ng | S2 |

FIG. 12

| State | Description |
|---|---|
| S0 | State in which SA has not yet been obtained |
| S1 | State in which ACL message can be sent |
| S2 | State in which response to ACL message is being waited for 250 ms |
| S3 | State in which no ACL message is sent |
| | State in which regular message is sent |
| | State in which no ACL message is sent |
| | State in which RACL message has been received |
| S4 | State in which ACL message can be sent |
| | State in which specific ACL message has been received in state in which regular message is sent |
| S5 | State in which ACL message can be sent |
| | State in which specific ACL message has been received in state in which response to ACL message is being waited for 250 ms |
| | State in which ACL message can be sent | ns
ELECTRONIC CONTROL UNIT, ELECTRONIC CONTROL SYSTEM, AND RECORDING MEDIUM

CROSS REFERENCE TO RELATED APPLICATION

The present application is based on and claims priority of Japanese Patent Application No. 2019-030809 filed on Feb. 22, 2019. The entire disclosure of the above-identified application, including the specification, drawings and claims is incorporated herein by reference in its entirety.

FIELD

The present disclosure relates to an electronic control unit (hereinafter also referred to as an ECU), an electronic control system, and a recording medium for sending and receiving a message to and from one or more other electronic control units via a Controller Area Network (CAN) bus, based on the Society of Automotive Engineers (SAE) J1939 standard.

BACKGROUND

The SAE J1939 standard is a controller bus standard applied to tracks, buses, vehicles for construction, tractors, trailers, etc. The ECUs of such vehicles send and receive messages based on the SAE J1939 standard. It has been pointed out that in some cases an unauthorized ECU performs a spoofing attack in which the unauthorized ECU pretends to be an authorized ECU by means of sending, to a CAN bus, an unauthorized message made by abusing an address claim message (hereinafter also referred to as an ACL) specified in the SAE J1939 standard. Regarding this, for example, Non-patent Literature 1 discloses a technique for detecting an anomaly made by abusing an ACL message in conformity with the SAE J1939 standard. More specifically, it is possible to detect an unauthorized message by performing, between ECUs, authentication and key sharing based on public key cryptography or secret key cryptography, and adding a Message Authentication Code (MAC) for detecting tampering on a CAN message packet using the shared key.

CITATION LIST

Non Patent Literature

NPL 1: Paul-Stefan Murvae, et al. "Security shortcomings and countermeasures for the SAE J1939 commercial vehicle bus protocol", IEEE Transactions on Vehicular Technology, Volume 67, Issue 5, May 2018

SUMMARY

Technical Problem

However, in the technique disclosed in Non-patent Literature 1, there is a need to perform communication for authentication and key sharing, and the need to perform such communication when starting CAN communication causes a delay problem. Furthermore, since a field of as much as 8 bytes is required to store a MAC in a CAN message packet, the amount of data which can be sent in a single CAN message is reduced by 8 bytes, which results in a problem that time required to send the CAN message is increased. In this way, the technique disclosed in Non-patent Literature 1 may deteriorate communication quality when trying to detect an anomaly made by abusing an ACL message in conformity with the SAE J1939 standard.

In view of this, the present disclosure provides an electronic control unit etc., for enabling detection of an anomaly made by abusing an ACK message in conformity with the SAE J1939 standard while reducing deterioration in communication quality.

Solution to Problem

In order to achieve the above object, an electronic control unit according to an aspect of the present disclosure is an electronic control unit which sends and receives a message to and from one or more other electronic control units via a Controller Area Network (CAN) bus, based on the Society of Automotive Engineers (SAE) J1939 standard, the electronic control unit including: a first determination unit configured to determine whether a message received is an address claim message; a second determination unit configured to determine, when it is determined that the message received is an address claim message, whether a device name included in the address claim message received is a predetermined device name; and a third determination unit configured to perform a predefined determination process, when it is determined that the device name included in the address claim message received is the predetermined device name, and determine whether the address claim message received is an unauthorized message according to a result of the predefined determination process.

In addition, in order to achieve the object, the electronic control system according to an aspect of the present disclosure includes the above electronic control unit, the one or more other electronic control units, and the CAN bus.

In order to achieve the above object, a recording medium according to an aspect of the present disclosure is a non-transitory computer-readable recording medium having a program recorded thereon, the program, when being executed by an electronic control unit which sends and receives a message to and from one or more other electronic control units via a Controller Area Network (CAN) bus, based on the Society of Automotive Engineers (SAE) J1939 standard, causes the electronic control unit to execute: determining whether a message received is an address claim message; determining, when it is determined that the message received is an address claim message, whether a device name included in the address claim message received is a predetermined device name; and performing a predefined determination process, when it is determined that the device name included in the address claim message received is the predetermined device name, and determining whether the address claim message received is an unauthorized message according to a result of the predefined determination process.

Advantageous Effects

According to the present disclosure, it is possible to detect an anomaly made by abusing an ACL message in conformity with the SAE J1939 standard while reducing deterioration in communication quality.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 11 is a diagram illustrating device names and states of other electronic control units according to Embodiment 2.

FIG. 12 is a diagram for illustrating states of electronic control units.

DESCRIPTION OF EMBODIMENTS

Embodiment 1

1.1 Configuration of Electronic Control System 1

Hereinafter, electronic control system 1 according to Embodiment 1 is described with reference to the drawings.

Figure 1:
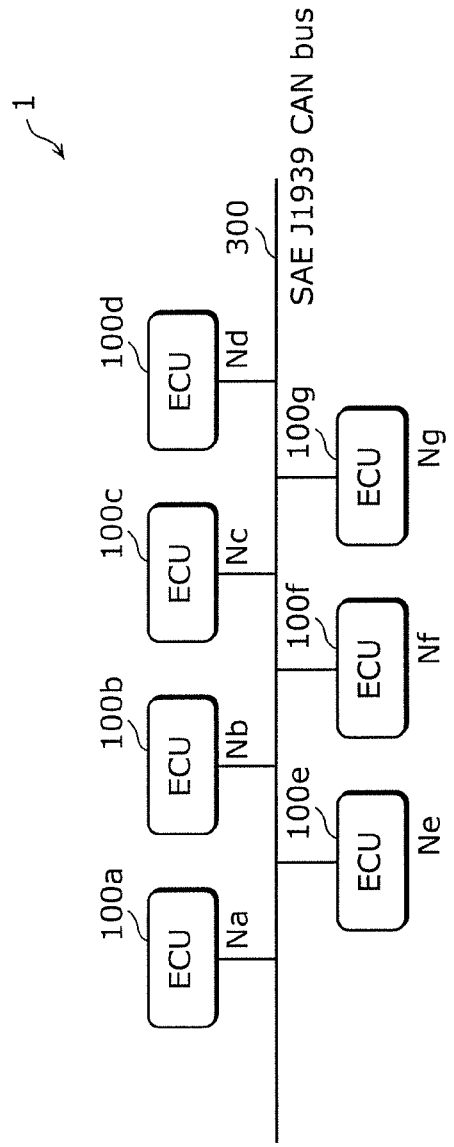
FIG. 1 is a configuration diagram illustrating one example of an electronic control system according to Embodiment 1.

FIG. 1 is a configuration diagram illustrating one example of electronic control system 1 according to Embodiment 1.

Electronic control system 1 is, for example, an on-vehicle network mounted on a vehicle. Electronic control system 1 includes a plurality of ECUs and CAN bus 300. Each ECU sends and receives a message to and from other ECUs via CAN bus 300 based on the SAE J1939 standard. For example, in Embodiment 1, electronic control system 1 includes ECUs 100a to 100g as a plurality of ECUs. Focusing on ECU 100a, ECU 100a sends and receives a message to and from other ECUs 100b to 100g via CAN bus 300 based on the SAE J1939 standard. In Embodiment 1, ECUs 100a to 100g are also collectively referred to as ECUs 100. In other words, what is referred to as ECU 100 in Embodiment 1 may be any one of ECUs 100a to 100g.

Non-limiting examples of ECUs 100 include a steering control ECU, a steering ECU, an engine ECU, a brake ECU, a door open/close sensor ECU, a window open/close sensor ECU, or the like.

Each ECU 100 is, for example, a device including a processor (micro processor), a digital circuit such as a memory, etc., an analog circuit, a communication circuit, etc. The memory is a ROM, a RAM, or the like, and is able to store a control program (a computer program as a software item) which is executed by the processor. For example, by means of the processor operating according to the control program (computer program), each ECU 100 performs various kinds of functions.

The SAE J1939 standard is a controller bus standard applied to tracks, buses, vehicles for construction, tractors, trailers, etc. The ECUs of such vehicles send and receive messages therebetween based on the SAE J1939 standard. In other words, each ECU 100 sends and receives a message to and from one or more other ECUs via CAN bus 300 based on the SAE J1939 standard.

Current ECU 100 (any one of ECUs 100) receives a message sent by another ECU 100 via CAN bus 300, and generates a message including details that are desired to be sent to the other ECU 100, and sends the message thereto via CAN bus 300. More specifically, current ECU 100 (specifically, application processing unit 130 that is described later) performs a process according to the details of the received message, generates a message including data indicating the state of a device, a sensor, or the like connected to current ECU 100, and including data indicating a command value (control value) to the other ECUs 100, and sends the message. The generated message includes a CANID. Current ECU 100 is capable of receiving only a message including the CANID predetermined for current ECU 100 itself and thus sending communication data to destination ECU 100.

Each ECU 100 is assigned with a unique 64-bit device name (hereinafter also referred to as a DN) at the time of being manufactured for example. In Embodiment 1, for example, as illustrated in FIG. 1, ECU 100a is assigned with Na as its DN, ECU 100b is assigned with Nb as its DN, . . . and ECU 100g is assigned with Ng as its DN. When a 64-bit DN is used for each communication between ECUs 100 in order to identify the sending source, the amount of data which can be sent is reduced by the amount (64 bits) of data used for the DN. Thus, an 8-bit source address (hereinafter also referred to as an SA) is used. A CANID includes an 8-bit SA, and ECU 100 that received a message including the CANID can identify the sending source by checking the SA included in the CANID.

1.2 Format

Hereinafter, descriptions are given of the formats of CANIDs and the formats of DNs for use in the SAE J1939 standard.

Figure 2:
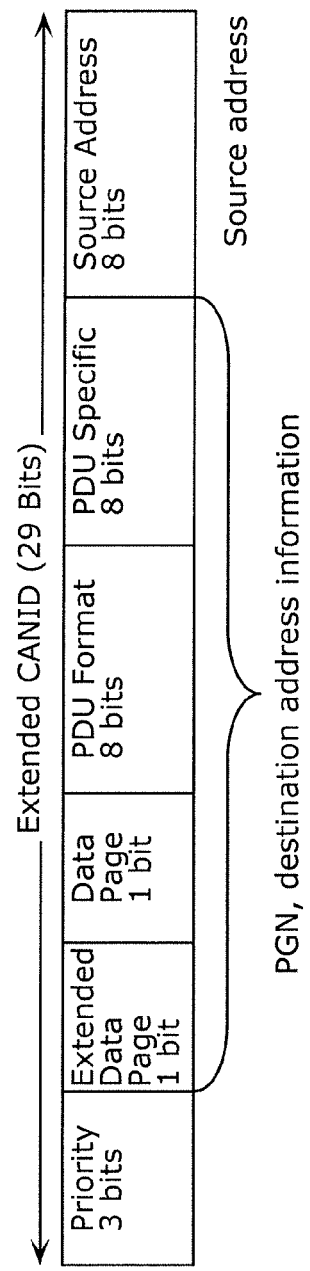
FIG. 2 illustrates a CANID format used in the SAE J1939 standard.

FIG. 2 is a diagram illustrating a format of a CANID for use in the SAE J1939 standard. FIG. 2 illustrates the format of a 29-bit extended CANID which has been extended for controller buses applicable to tracks, buses, vehicles for construction, tractors, trailers, etc., based on a 11-bit standard ID format defined according to the CAN protocol. Based on FIG. 2, it is known that the extended CANID includes an SA assigned in the least significant 8 bits in order to identify the sending source, in addition to fields including a Parameter Group Number (PGN) for identifying a message, destination address information, etc. Further descriptions are omitted. Each ECU 100 negotiates with other ECUs 100 by sending an ACL message after being booted up, and obtains an SA which does not conflict with the SAs of the other ECUs 100. The ACL message is a message which is used by the ECU to obtain the SA, and includes the DN assigned to the ECU and the SA desired by the ECU. Basically, the ACL message is sent by the ECU after the ECU is being booted up. However, the SAE J1939 standard allows that an ACL message is sent at any timing after the ECU is booted up assuming an exemplary use case where an ECU diagnosing tool is connected to a CAN bus and used after the ECU is being booted up. The other ECU which received the ACL message can know that the ECU assigned with the DN included in the ACL massage is trying to obtain the SA included in the ACL message. The method for obtaining an SA by sending an ACL message is described in detail later.

Figure 3:
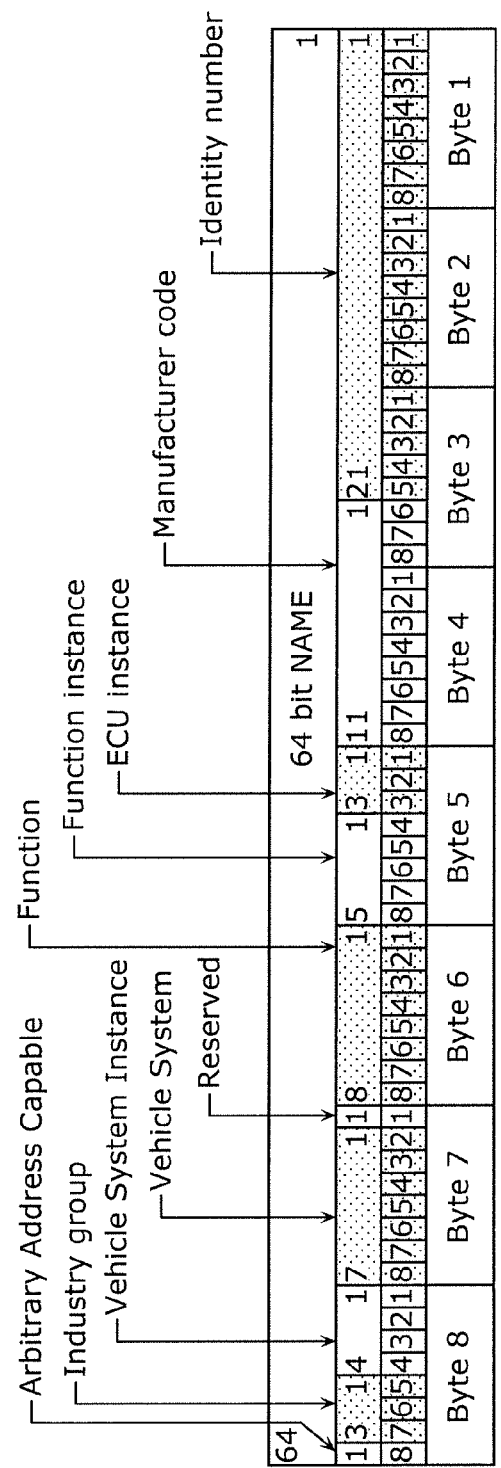
FIG. 3 illustrates a format of a device name assigned to an electronic control unit.

FIG. 3 is a diagram illustrating the format of a DN assigned to an ECU.

In general, as illustrated in FIG. 3, an ECU is pre-assigned with a 64-bit DN including profile information and identification information of the ECU itself (detailed descriptions are omitted). Since the DN needs to be unique for each ECU, each ECU is assigned with a DN which does not overlap with the DNs of the other ECUs.

1.3 ACL Message

Next, a method for obtaining an SA by each ECU 100 is described.

Current ECU 100 sends an ACL message via CAN bus 300 in order to obtain an SA for causing other ECUs 100 in electronic control system 1 to recognize current ECU 100 without conflicting with the other ECUs 100. Here, a rule at the time of obtaining an SA by sending an ACL message in the SAE J1939 standard is described using FIG. 4.

Figure 4:
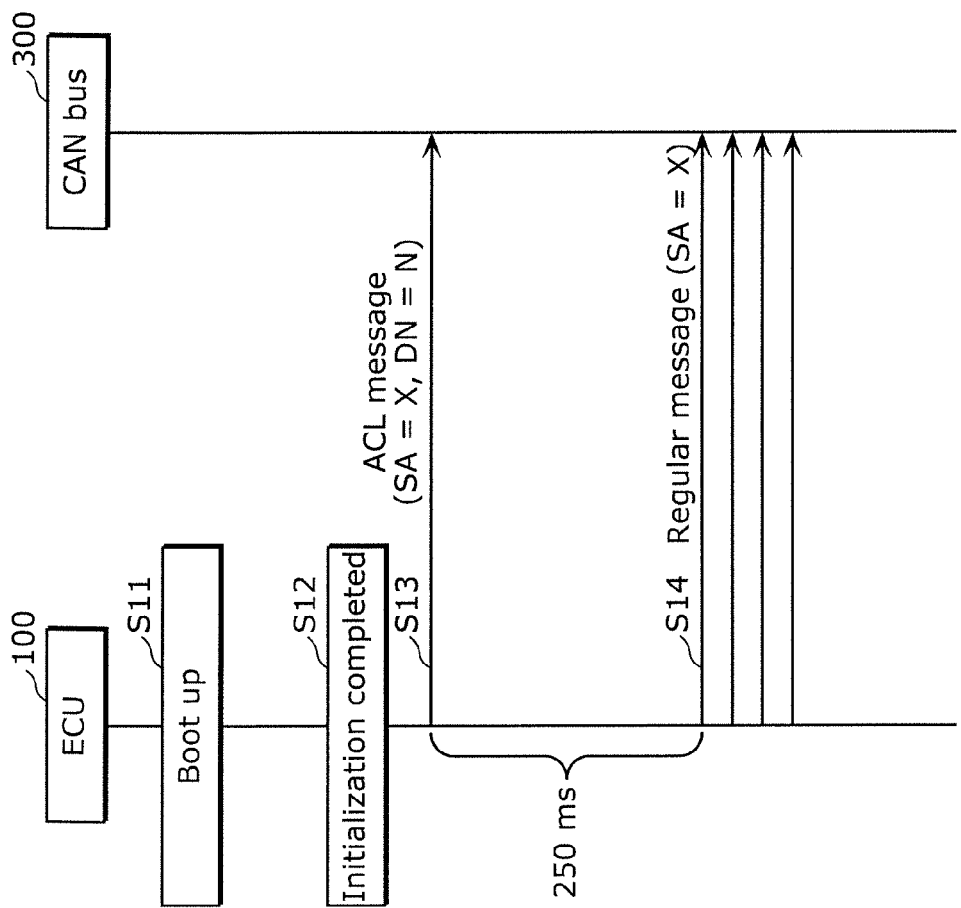
FIG. 4 is a sequence diagram for explaining a rule in the case of obtaining a source address by sending an ACL message.

FIG. 4 is a sequence diagram for describing the rule at the time of obtaining the SA by sending the ACL message.

First, current ECU 100 is booted up (Step S11). Current ECU 100 performs an operation for obtaining an 8-bit SA that current ECU 100 desires after being booted up.

When initialization after the boot up is completed (Step S12), current ECU 100 sends an ACL message including the SA that current ECU 100 desires (for example, it is assumed here that X is desired as the SA) and its DN (for example, N) via CAN bus 300 (Step S13). In other words, current ECU 100 declares that current ECU 100 is trying to obtain X as its SA to the other ECUs 100 by broadcasting the ACL message to the other ECUs 100.

According to the SAE J1939 standard, each ECU 100 stores X as the SA of current ECU 100 assigned with N as its DN in the case where none of the other ECUs 100 objects to the ACL message. In the opposite case where any one of the other ECUs 100 objects to the ACL message, for example, when there is an SA conflict, there is a rule that the one of ECUs 100 which also desires to obtain the SA should return a response to the ACL message within 250 ms after the reception of the ACL message. For this reason, when there is no objection (that is, a response to the ACL message sent) from any one of the other ECUs 100 within 250 ms after the sending of the ACL message, current ECU 100 regards that the other ECUs 100 acknowledged that current ECU 100 uses X as its SA, and starts to send a message including the extended CANID (hereinafter also referred to as a regular message) as illustrated in FIG. 2 using the SA that current ECU 100 desires (Step S14). Since the regular message includes X as the SA, the other ECUs 100 recognize that the SA included in the message is X, and thus can identify that the sending source of the message is ECU 100 assigned with N as its DN.

Figure 5A:
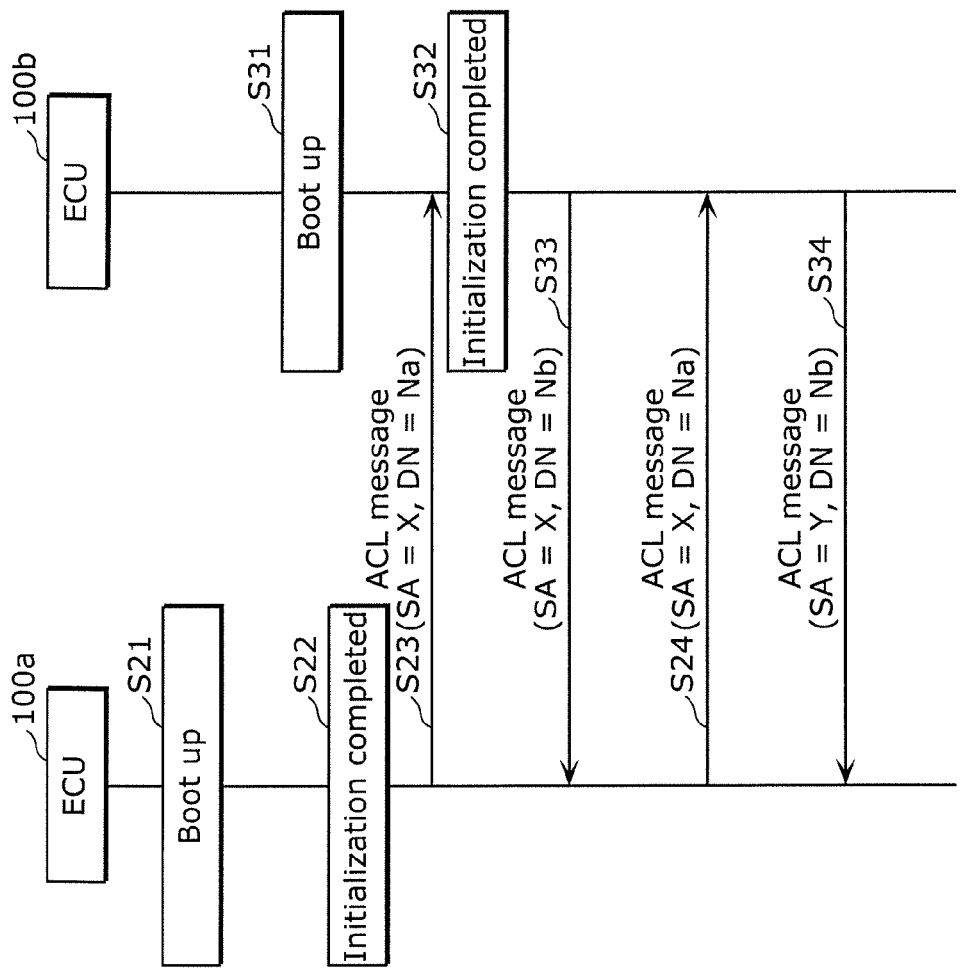
FIG. 5A is a sequence diagram for explaining a rule in the case where a source addresses conflict occurred.
Figure 5B:
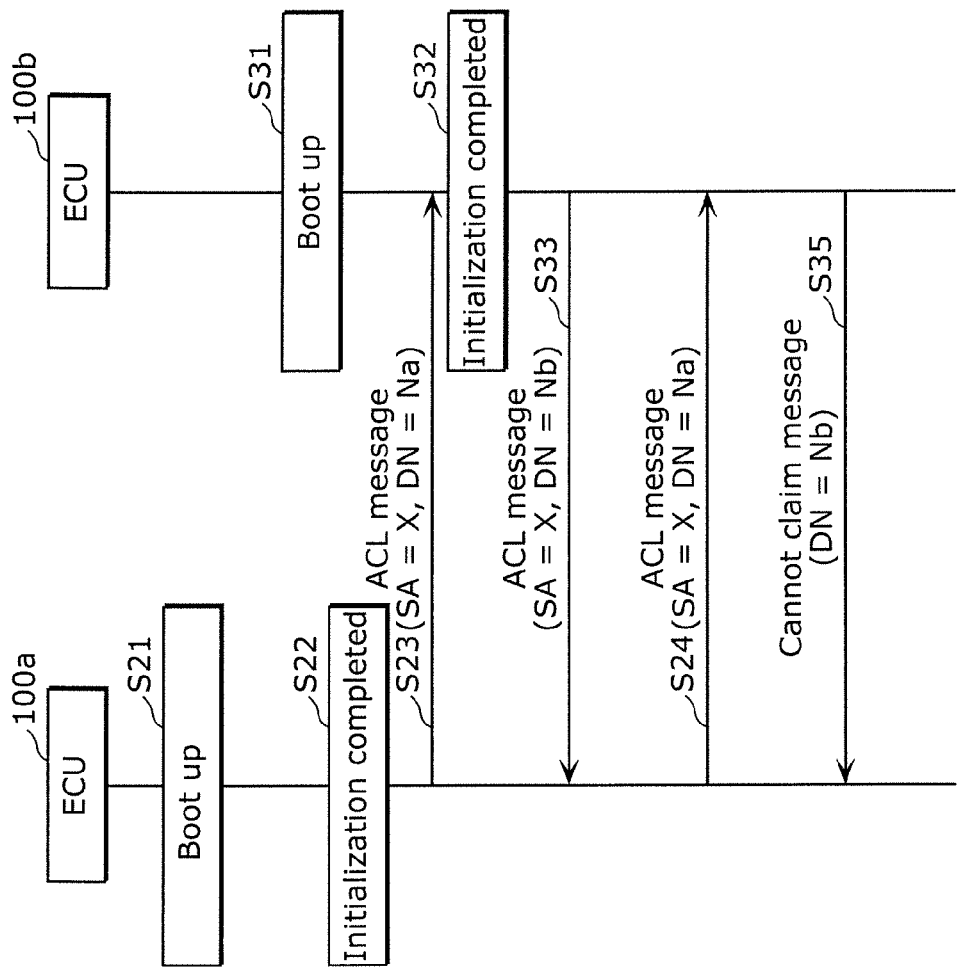
FIG. 5B is a sequence diagram for explaining a rule in the case where a source addresses conflict occurred.

Next, the rule in the case where there is an SA conflict is described using FIGS. 5A and 5B.

Each of FIGS. 5A and 5B is a sequence diagram for explaining the rule in the case where there is an SA conflict. FIG. 5A illustrates one example where an SA conflict occurred between ECUs 100, and ECUs 100 solved the conflict and each obtained an SA. FIG. 5B illustrates one example where an SA conflict occurred between ECUs 100, and one of ECUs 100 was not able to solve the conflict and to obtain an SA. Each of FIGS. 5A and 5B illustrates the rule taking ECUs 100a and 100b as examples of ECUs 100 between which the SA conflict occurred. It seems that ECU 100a and ECU 100b perform direct communication with each other in each of FIGS. 5A and 5B, but, in reality, the communication is performed via CAN bus 300. Hereinafter, an expression to the effect that a certain ECU sends and receives a message etc., to and from another ECU is given in some cases for the following reasons: the certain ECU sends a message etc., to CAN bus 300, the other ECU receives the message etc., from CAN bus 300, the other ECU sends a message etc., to CAN bus 300, the certain ECU receives the message etc., from CAN bus 300, which results in sending and receiving of the messages etc., between the certain ECU and the other ECU.

First, an example where each of ECUs 100 between which an SA conflict occurred obtains an SA successfully.

As illustrated in FIG. 5A, ECU 100a is booted up (Step S21), when the initialization after the boot up is completed (Step S22), ECU 100a sends, to ECU 100b, an ACL message including an SA that ECU 100a desires (for example, X here) and Na which is its DN (Step S23).

ECU 100b is booted up after the boot up of ECU 100a (Step S31). The ACL message has been sent from ECU 100a before the initialization of ECU 100b is completed, and thus ECU 100b cannot receive the ACL message from ECU 100a. For this reason, ECU 100a does not receive a response to the ACL message that ECU 100a transmitted from any of ECUs 100 including ECU 100b, and thus obtains X as its SA and starts to transmit a regular message.

When the initialization of ECU 100b after the boot up is completed (Step S32), since ECU 100b is not aware of the fact that ECU 100a tried to obtain X as its SA, ECU 100b sends, to ECU 100a, an ACL message including an SA which ECU 100b desires (for example, X that is the same as the SA obtained by ECU 100a here) and Nb which is its DN (Step S33).

In the SAE J1939 standard, in the case where an SA conflict occurred, there is a rule that an ECU having a DN whose value (specifically, a 64-bit integer value) is smaller should preferentially obtain the conflicting SA. For this reason, it is determined that the ECU having a DN whose value is larger abandons the obtainment of the conflicting SA, selects another SA and sends an ACL message including the selected SA. When an ECU cannot obtain an SA (for example, when the ECU was not able to obtain any SA after sending ACL messages regarding various SAs in order to obtain an SA for a certain period of time or when the ECU cannot obtain any SA even by sending ACL messages regarding all SA candidates), the ECU sends a cannot claim message indicating that no SA has been obtained, and transits to a stoppage state. The cannot claim message is a message which includes the DN assigned to the ECU, and is for notifying the other ECUs of the fact that the ECU assigned with the DN was not able to obtain any SA. The other ECUs which received the cannot claim message are able to know that the ECU assigned with the DN included in the cannot claim message was not able to obtain any SA.

Since ECU 100a obtains X as its SA and ECU 100b sends the ACL message in which X is requested as its SA, an SA conflict occurs. It is assumed that Na which is the DN of ECU 100a is smaller than Nb which is the DN of ECU 100b. In this case, ECU 100a is the ECU which preferentially obtains the SA over ECU 100b. Thus, ECU 100a re-sends, to ECU 100b, an ACL message including X as its SA and Na which is the DN of ECU 100a itself as an objection to the ACL message that ECU 100b transmitted (Step S24).

ECU 100b recognizes that ECU 100a assigned with, as its DN, Na smaller than Nb which is the DN of ECU 100b itself preferentially obtains X as its SA, and sends an ACL message including Y as re-selected another SA (Step S34). ECU 100b obtains Y as its SA in the case where there is no response to the ACL message that ECU 100b sent, from other ECUs 100 within 250 ms after the sending of the ACL message.

Since ECU 100b has not yet been initialized and thus has not yet recognized that ECU 100a is trying to obtain X as its SA, ECU 100b has sent an ACL message including X as its SA in Step S33. On the other hand, when ECU 100b obtains, from ECU 100a, the ACL message including X as its SA and Na as its DN after being initialized, ECU 100b does not send an ACL including X as its SA and sends an ACL including another SA because ECU 100a has a higher priority level than that of ECU 100b.

Next, an example where one of ECUs 100 between which an SA conflict occurred was not able to obtain an SA. It is to be noted that the processes in Step S21 to Step S24 and Step S31 to Step S33 are the same as those in FIG. 5A, and thus are not described here.

After Step S24, ECU 100b recognizes that ECU 100a assigned with, as its DN, Na smaller than Nb that is the DN of ECU 100b itself preferentially obtains X as its SA, and when trying to obtain another SA but was not able to obtain the SA, ECU 100b sends a cannot claim message including Nb as its DN and transits to a stoppage state (Step S35). In this way, the other ECUs 100 including ECU 100a knows that the DN included in the message is Nb, thereby recognizing that ECU 100b has not yet obtained an SA and in the stoppage state.

1.4 Abuse of ACL Message

Next, a possibility that an ACL message in conformity with the SAE J1939 standard is abused is described with reference to FIG. 6.

Figure 6:
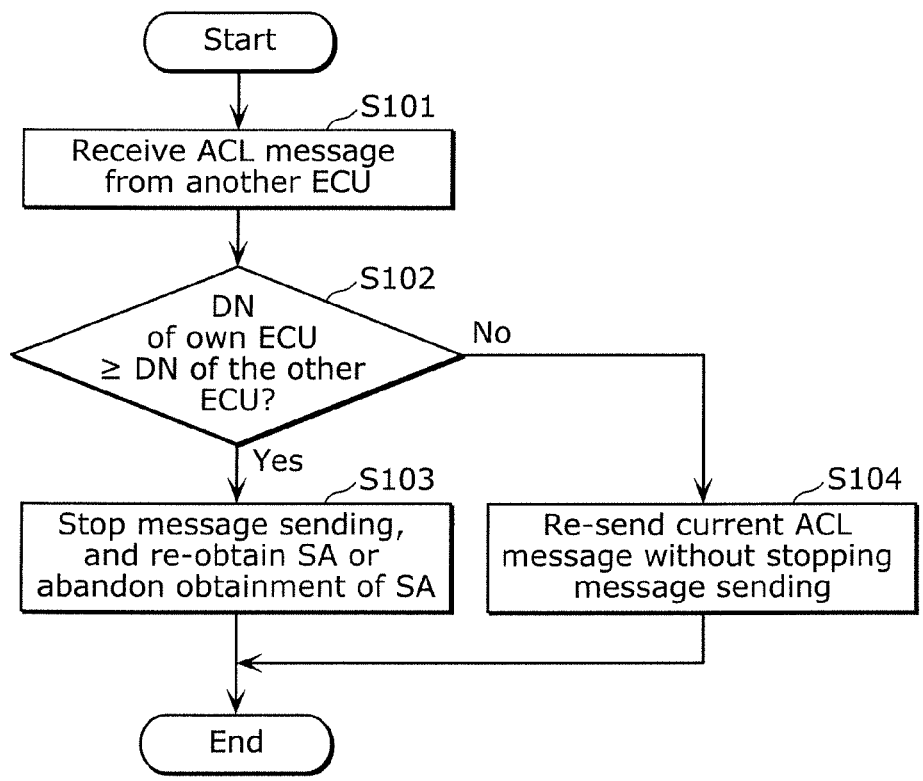
FIG. 6 is a flow chart for explaining that an ACL message in conformity with the SAE J1939 standard can be abused.

FIG. 6 is a flow chart for explaining that an ACL message in conformity with the SAE J1939 standard can be abused. FIG. 6 is a flow chart indicating an operation performed by current ECU 100 which has obtained its SA in the case where current ECU 100 receives an ACL message from another ECU 100 while current ECU 100 which has obtained its SA is sending a regular message.

Current ECU 100 receives the ACL message from the other ECU 100 (Step S101). For example, current ECU 100 receives, from the other ECU 100, an ACL message including an SA which is identical to the already obtained SA of current ECU 100.

Current ECU 100 compares the value indicated by the DN of current ECU 100 (its own DN) with the value indicated by the DN (the other's DN) included in the received ACL message, and determines whether the value indicated by its own DN is greater than or equal to the value indicated by the other's DN (Step S102).

In the case where the value indicated by its own DN is smaller than the value indicated by the other's DN (No in Step S102), current ECU 100 does not stop sending of a regular message and sends an ACL message including the obtained SA and its own DN to the other ECU 100 because current ECU 100 has a higher priority level than that of the other ECU 100 (Step S104). In this way, the other ECU 100 recognizes that the other ECU 100 cannot obtain the SA.

In the opposite case where the value indicated by its own DN is greater than or equal to the value indicated by the other's DN (Yes in Step S102), current ECU 100 stops sending of a regular message, tries to obtain another SA, and abandons obtainment of an SA when no SA can be obtained (Step S103).

Here, as illustrated in Step S102, the SAE J1939 standard prescribes that the other ECU 100 should be determined to have a higher priority level than that of current ECU 100 even when the value indicated by the DN of the other ECU 100 included in the received ACL message is equal to the value indicated by the DN of current ECU 100. For this reason, current ECU 100 is caused to stop sending of a regular message when current ECU 100 has received an unauthorized ACL message including the SA identical to the own SA.

In view of the above, for example, by means of an ACL message in conformity with the SAE J1939 standard being abused, it is conceivable that an attack of spoofing in which unauthorized ECU pretends to be authorized ECU 100 or an attack of changing the SA of an authorized ECU is performed. Hereinafter, a description is given of such an attack of spoofing in which an unauthorized ECU connected to CAN bus 300 pretends to be authorized ECU 100a and an attack of changing the SA of ECU 100a while ECU 100a whose DN is Na and which has obtained Sx as its SA is sending a regular message.

First, the attack of spoofing in which the unauthorized ECU pretends to be ECU 100a is described.

First, the unauthorized ECU sends, to CAN bus 300, an ACL message including Na as its DN and Sx as its SA. ECU 100a receives the ACL message including Na as the DN and Sx as the SA. ECU 100a determines that the unauthorized ECU has a higher priority level than that of ECU 100a because the value indicated by the DN of the unauthorized ECU included in the ACL message is equal to the value indicated by the own DN, and thus stops sending of a regular message, and transmits an ACL message including another SA (for example, Sy) to CAN bus 300.

In this way, the unauthorized ECU immediately sends an ACL message including Na as its DN and Sy as its SA to CAN bus 300 in order to receive the ACL message including Na as its DN and Sy as its SA, thereby preventing ECU 100a from obtaining Sy as its SA.

In this way, the unauthorized ECU keeps preventing ECU 100a from obtaining the SA until ECU 100a abandons the obtainment of the SA (that is, until ECU 100a sends a cannot claim message). In this way, it becomes impossible for ECU 100a to send a regular message, and, hereinafter, it becomes possible for the unauthorized ECU to send a message by pretending to be ECU 100a whose DN is Na.

Next, an attack in which the SA of ECU 100a is changed is described.

First, the unauthorized ECU sends, to CAN bus 300, an ACL message including Na as its DN and Sy as its SA. ECU 100a receives the ACL message including Na as the DN and Sy as the SA, but does not respond to and ignores the ACL message because the SA included in the ACL message is different from the SA that ECU 100*a* has obtained and thus no SA conflict occurs. The other ECUs 100 misrecognize that ECU 100*a* whose DN is Na has changed its SA to Sy. In this way, the other ECUs 100 hereinafter ignore an authorized message including Sx as the SA that is sent by ECU 100*a*, and receives an unauthorized message including Sy as the SA that is sent by the unauthorized ECU.

The above descriptions have been given of the attacks which can be performed when each ECU 100 does not have a function of detecting an anomaly made by abusing an ACL message in conformity with the SAE J1939 standard. Hereinafter, descriptions are given of the configuration of each of ECUs 100 (ECUs 100*a* to 100*g*) and an operation performed by each ECU 100 assuming that each ECU 100 has a function of detecting an anomaly made by abusing an ACL message in conformity with the SAE J1939 standard.

1.5 Configuration of ECU 100

Figure 7:
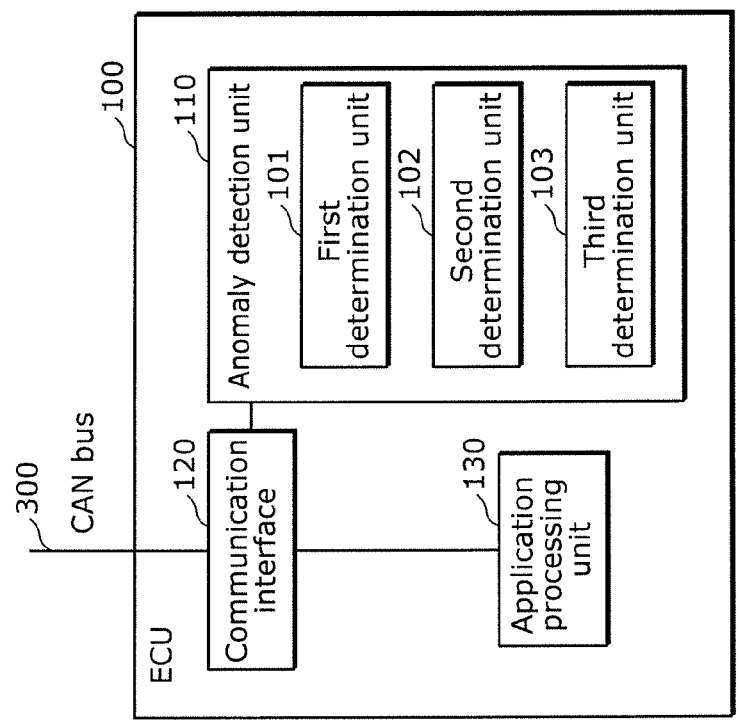
FIG. 7 is a block diagram illustrating one example of an electronic control unit according to Embodiment 1.

FIG. 7 is a block diagram illustrating one example of ECU 100 according to Embodiment 1.

ECU 100 includes anomaly detection unit 110, communication interface 120, and application processing unit 130.

Communication interface 120 receives a message that flows in CAN bus 300, and sends a message to CAN bus 300.

Application processing unit 130 is an element for performing intrinsic control of an ECU. For example, when ECU 100 is a steering ECU, application processing unit 130 controls steering according to a message received via communication interface 120, and sends a message according to details of control of steering to CAN bus 300 via communication interface 120.

Anomaly detection unit 110 is a unique element of ECU 100 according to Embodiment 1, and includes first determination unit 101, second determination unit 102, and third determination unit 103. First determination unit 101, second determination unit 102, and third determination unit 103 are implemented by means of, for example, a processor operating according to a control program.

First determination unit 101 determines whether the message received is an ACL message.

Second determination unit 102 determines, when it has been determined that the received message is an ACL message, whether the DN included in the ACL message received is a predetermined DN.

Third determination unit 103 performs a predefined determination process, when it has been determined that the DN included in the ACL message received is the predetermined DN, and determines whether the ACL message received is an unauthorized message according to the result of the predefined determination process.

First determination unit 101, second determination unit 102, and third determination unit 103 are described in detail with reference to FIG. 8.

1.6 Configuration of ECU 100

Figure 8:
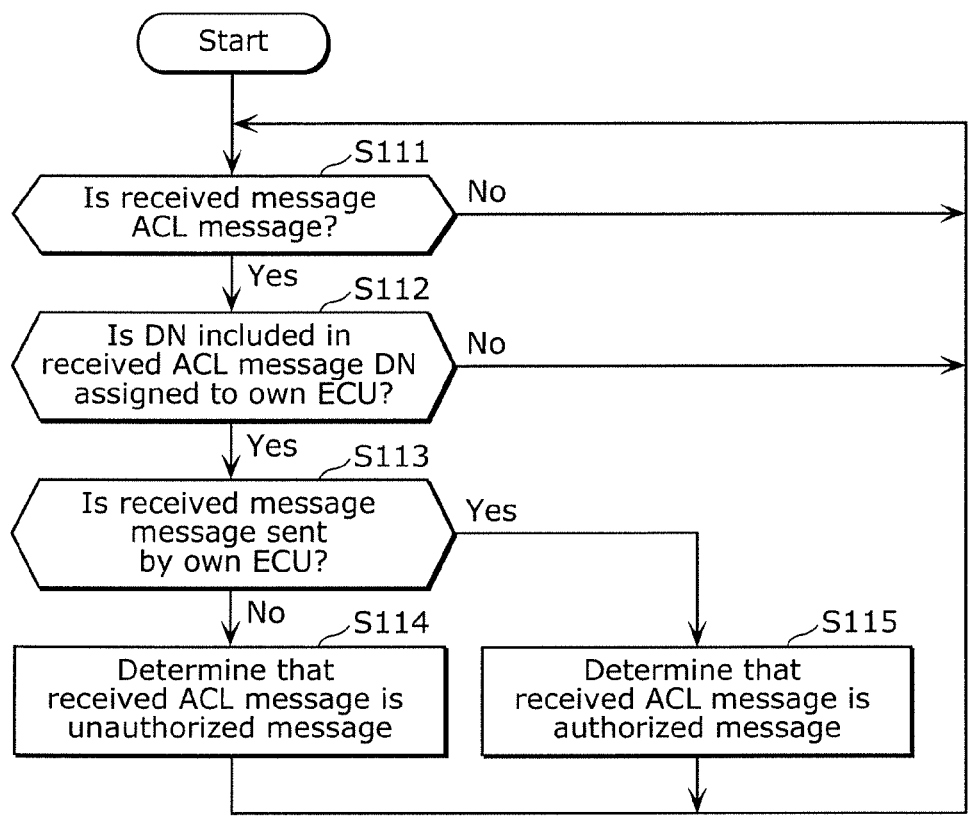
FIG. 8 is a flow chart illustrating one example of an operation performed by the electronic control unit according to Embodiment 1.

FIG. 8 is a block diagram illustrating one example of ECU 100 according to Embodiment 1.

First, first determination unit 101 determines whether the received message is an ACL message (Step S111). Messages received by communication interface 120 include regular messages and ACL-related messages relating to obtainment of SAs. Whether a received message is an ACL message can be determined by first determination unit 101. It is to be noted that the ACL-related messages relating to obtainment of SAs are an ACL message, a cannot claim message, and a request for address claim message that is described later. When first determination unit 101 determines that the received message is not an ACL message (No in Step S111), a return is made to the process in Step S111, and reception of an ACL message is waited.

When it has been determined that the received message is not an ACL message by first determination unit 101 (Yes in Step S111), second determination unit 102 determines whether the DN included in the received ACL message is a predetermined DN. In Embodiment 1, the predetermined DN is the DN assigned to ECU 100. In other words, second determination unit 102 determines whether the DN included in the received ACL message is the DN assigned to the ECU 100 itself (Step S112). In this way, for example, it is possible to determine whether an unauthorized ECU has sent the ACL message using the DN assigned to ECU 100. When second determination unit 102 determines that the DN included in the received ACL message is not the DN assigned to the ECU 100 itself (No in Step S112), a return is made to the process in Step S111, and first determination unit 101 waits reception of an ACL message.

When it has been determined that the DN included in the received ACL message is not the DN assigned to the ECU 100 itself by second determination unit 102 (Yes in Step S112), third determination unit 103 performs the predetermined process. In Embodiment 1, third determination unit 103 determines, in the predefined determination process, whether the received ACL message is a message sent by ECU 100 (that is the ECU 100 itself) (Step S113). The predefined determination process is performed because when ECU 100 sent a message to CAN bus 300, the message is also sent to ECU 100 itself from CAN bus 300, and thus the ACL message including the DN assigned to ECU 100 may be the message that ECU 100 itself sent. For example, ECU 100 is capable of performing the predefined determination process by setting a flag when sending an ACL message, and checking whether the flag is set when receiving an ACL message including the DN assigned to ECU 100 itself.

When third determination unit 103 determines that the received ACL message is not a message sent by ECU 100 itself (No in Step S113), third determination unit 103 determines that the received ACL message is an unauthorized message (Step S114). In other words, third determination unit 103 is capable of concluding that the ACL message has been transmitted by an unauthorized ECU when receiving the ACL message although ECU 100 itself has not sent an ACL message including its DN, and thus is capable of determining that the ACL message is an unauthorized message. In this way, ECU 100 can prevent an attack of spoofing in which an unauthorized ECU pretends to be ECU 100 by abusing an ACL message or an attack of changing the SA of ECU 100.

When third determination unit 103 determines that the received ACL message is a message sent by ECU 100 itself (Yes in Step S113), third determination unit 103 determines that the received ACL message is an authorized message (Step S115). As described above, the ACL message is an authorized message that ECU 100 itself sent.

1.7 Conclusion

As described above, each ECU 100 in electronic control system 1 detects an anomaly made by abusing an ACL message in conformity with the SAE J1939 standard. More specifically, when ECU 100 received an ACL message including its own DN although ECU 100 itself has not sent the ACL message, ECU 100 determines that the ACL message is an unauthorized message. With ECU 100 according to Embodiment 1, no communication for authentication and key sharing is performed, and no delay due to such communication occurs. In addition, with ECU 100 according to Embodiment 1, no field for storing a MAC in a CAN message packet is necessary, and thus time required to send the message does not increase. Accordingly, with ECU 100 according to Embodiment 1, it is possible to detect an anomaly made by abusing an ACL message in conformity with the SAE J1939 standard while reducing deterioration in communication quality.

Embodiment 2

In Embodiment 1, each ECU 100 in electronic control system 1 has a function for detecting an anomaly made by abusing an ACL message in conformity with the SAE J1939 standard. However, an only exclusive ECU for detecting an anomaly in an electronic control system has such a function. In Embodiment 2, a description is given of how the anomaly detection ECU having such a function detects an anomaly made by abusing an ACL message in conformity with the SAE J1939 standard.

2.1 Configuration of Electronic Control System 2

Figure 9:
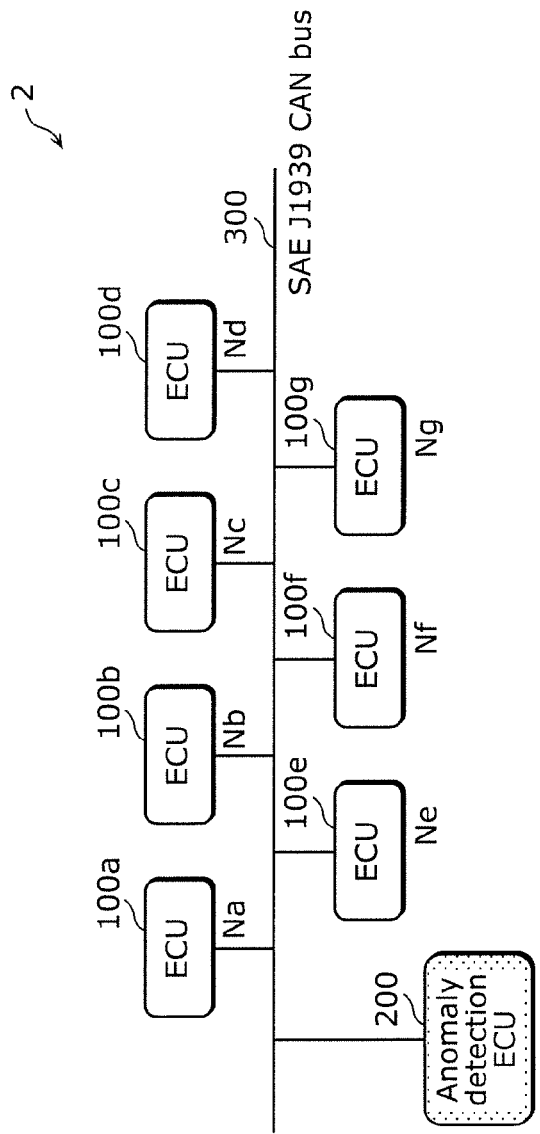
FIG. 9 is a configuration diagram illustrating one example of an electronic control system according to Embodiment 2.

FIG. 9 is a configuration diagram illustrating one example of electronic control system 2 according to Embodiment 2.

Electronic control system 2 is, for example, an in-vehicle network mounted on a vehicle, similarly to electronic control system 1 according to Embodiment 1. Electronic control system 2 includes anomaly detection ECU 200 in addition to ECUs 100a to 100g in electronic control system 1. Anomaly detection ECU 200 is an electronic control unit which sends and receives a message to and from other ECUs 100a to 100g via CAN bus 300 based on the SAE J1939 standard.

Anomaly detection ECU 200 is, for example, a device including a processor (micro processor), a digital circuit such as a memory, etc., an analog circuit, a communication circuit, etc. The memory is a ROM, a RAM, or the like, and is able to store a control program (a computer program as a software item) which is executed by a processor. For example, by means of a processor operating according to a control program (computer program), anomaly detection ECU 200 performs various kinds of functions.

Each ECU 100 is assigned with a DN as in Embodiment 1, and as illustrated in FIG. 9, ECU 100a is assigned with Na as a DN, ECU 100b is assigned with Nb as a DN, . . . and ECU 100g is assigned with Ng as a DN.

2.2 Configuration of Anomaly Detection ECU 200

Figure 10:
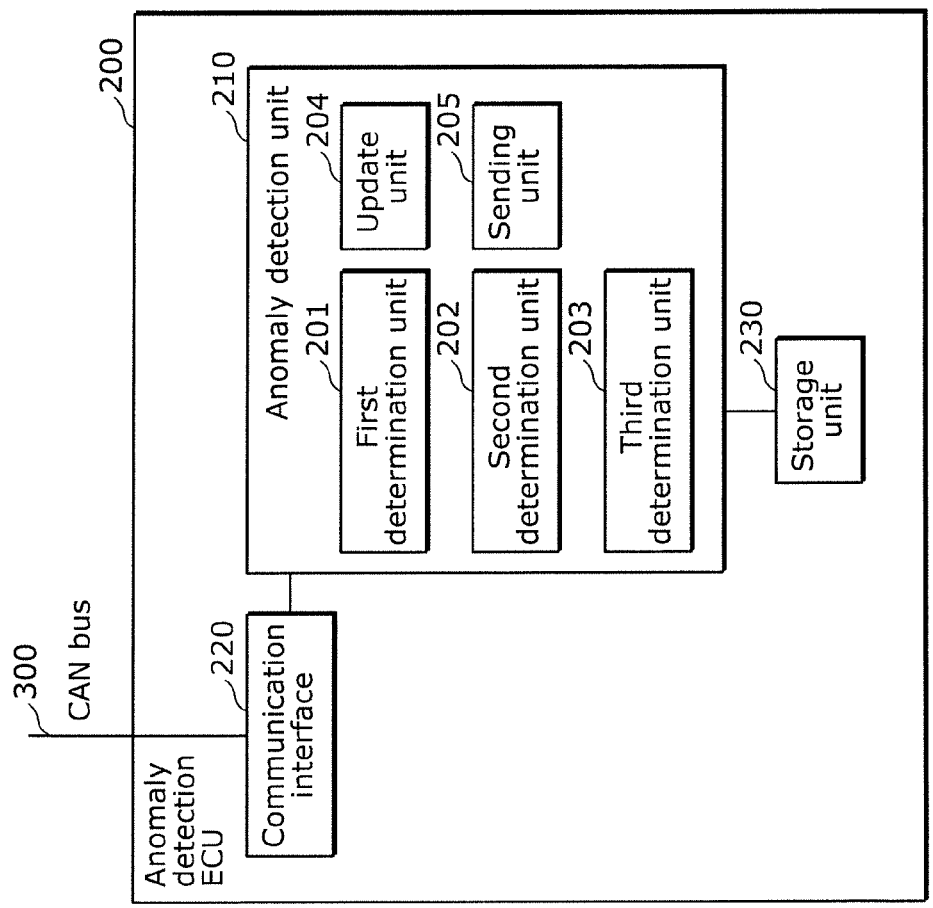
FIG. 10 is a block diagram illustrating one example of an electronic control unit according to Embodiment 2.

FIG. 10 is a block diagram illustrating one example of an electronic control unit (anomaly detection ECU 200) according to Embodiment 2.

Anomaly detection ECU 200 includes anomaly detection unit 210, communication interface 220, and storage unit 230.

Communication interface 220 receives a message that flows in CAN bus 300, and sends a message to CAN bus 300.

Anomaly detection unit 210 is a unique element of anomaly detection ECU 200 according to Embodiment 2, and includes first determination unit 201, second determination unit 202, third determination unit 203, update unit 204, and sending unit 205. First determination unit 201, second determination unit 202, third determination unit 203, update unit 204, and sending unit 205 are implemented by means of, for example, a processor operating according to a control program.

First determination unit 201 determines whether the received message is an ACL message.

Second determination unit 202 determines whether the DN included in the received ACL message is a predetermined DN when the received message is determined to be an ACL message. The predetermined DN in Embodiment 2 is different from the one (that is, the DN assigned to ECU 100) in Embodiment 1. Details are described later.

Third determination unit 203 performs a predefined determination process, when it has been determined that the DN included in the ACL message received is the predetermined DN, and determines whether the ACL message received is an unauthorized message according to a result of the predefined determination process. The predefined determination process in Embodiment 2 is different from the one (that is, a process for determining whether the ACL message received is a message sent by ECU 100) in Embodiment 1. Details are described later.

Update unit 204 updates the states of other ECUs 100a to 100g stored in storage unit 230.

Sending unit 205 sends a request for address claim (also referred to as RACL) message to CAN bus 300 when anomaly detection ECU 200 is booted up. The RACL message is a message to each ECU on CAN bus 300 sent to make an inquiry about the SA of the ECU. When the ECU that received the RACL message has obtained an SA, the ECU returns an ACL message including the obtained SA and its own DN. When the ECU that received the RACL message has not yet obtained any SA, the ECU returns a cannot claim message. Sending of RACL allows sending unit 205 to check the states of ECUs 100a to 100g on CAN bus 300 in terms of obtainment of SAs.

First determination unit 201, second determination unit 202, third determination unit 203, update unit 204, and sending unit 205 are described in detail with reference to FIG. 13 described later.

Storage unit 230 is a memory for storing the states of the other ECUs 100a to 100g. It is to be noted that storage unit 230 may be the same as the memory in which a control program that is executed by a processor is stored, or a memory that is prepared separately from the former memory.

Here, the states of the other ECUs 100a to 100g stored in storage unit 230 are described with reference to FIGS. 11 and 12.

FIG. 11 is a diagram illustrating the DNs and states of the other ECUs 100a to 100g according to Embodiment 2.

For example, as illustrated in FIG. 11, storage unit 230 stores the DNs of ECUs 100a to 100g and the states of the DNs (in other words, ECUs assigned with the DNs). Storage unit 230 stores a DN list as illustrated in FIG. 11. Based on the DN list, anomaly detection ECU 200 can recognize that ECUs assigned with DNs that are Na, Nb, Nc, Nd, Ne, Nf, and Ng are connected to CAN bus 300. When a new ECU is connected to CAN bus 300, it is to be noted that, for example, the DN of the new ECU is added to the list stored in storage unit 230. In addition, the state of an ECU is associated with the DN of the ECU, and thus anomaly detection ECU 200 can recognize the state of the DN (that is, the corresponding one of ECUs 100a to 100g) with reference to the correspondence. Hereinafter, the states are represented as State S0 to State S5. State S0 to State S5 are described with reference to FIG. 12.

FIG. 12 is a diagram for describing the states of ECUs.

State S0 is a state in which an ECU has not yet obtained an SA. More specifically, State S0 includes a state in which an ECU has not been booted up and has not been able to obtain an SA, a state in which an ECU having an SA is trying to obtain an SA again because another ECU having a higher priority level appeared, and a state in which an ECU tried to obtain an SA but was not able to obtain any SA and abandoned obtainment of an SA. These states are states in which the ECU can send an ACL message in the future.

State S1 is a state in which an ECU is waiting, for 250 ms, a response to an ACL message that the ECU has sent. The state is a state in which no ACL message is sent unless the ECU receives an RACL message, or the ECU receives, from another ECU, an ACL message including the SA that is identical to the SA included in the ACL message that the ECU sent.

State S2 is a state in which an ECU obtains an SA and sends a regular message. The state is a state in which no ACL message is sent unless the ECU receives an RACL message, or the ECU receives, from another ECU, an ACL message including the SA that is identical to the SA included in the ACL message that the ECU sent.

State S3 is a state in which an ECU received an RACL message. This state is a state in which the ECU is about to respond to the RACL message and can sent an ACL message.

State S4 is a state in which a specific ACL message has been received from another ECU in a state in which an ECU sends a regular message (that is, in State S2). The specific ACL message is an ACL message including a DN that is larger than the DN of a current ECU and an SA that is identical to the SA obtained by the current ECU. The state is a state in which there is an SA conflict, and since the DN of the current ECU is smaller than the DN of the other ECU, that is, the current ECU has a higher priority level than the other ECU, the current ECU can send an ACL message in order to let the other ECU know that the priority level of the current ECU is higher.

State S5 is a state in which an ECU received a specific ACL message from another ECU in a state in which the ECU has been waiting, for 250 ms, a response to the ACL message that the ECU sent (that is, in State S1). The specific ACL message is an ACL message including a DN that is larger than the DN of a current ECU and the SA that is identical to the SA included in the ACL message sent by the current ECU. The state is a state in which there is an SA conflict, and since the DN of the current ECU is smaller than the DN of the other ECU, that is, the current ECU has a higher priority level than the other ECU, the current ECU can send an ACL message in order to let the other ECU know that the priority level of the current ECU is higher.

It is to be noted that state transitions between State S0 to State S5 are illustrated also in FIG. 15 described later.

2.3 Configuration of Anomaly Detection ECU 200

Figure 13:
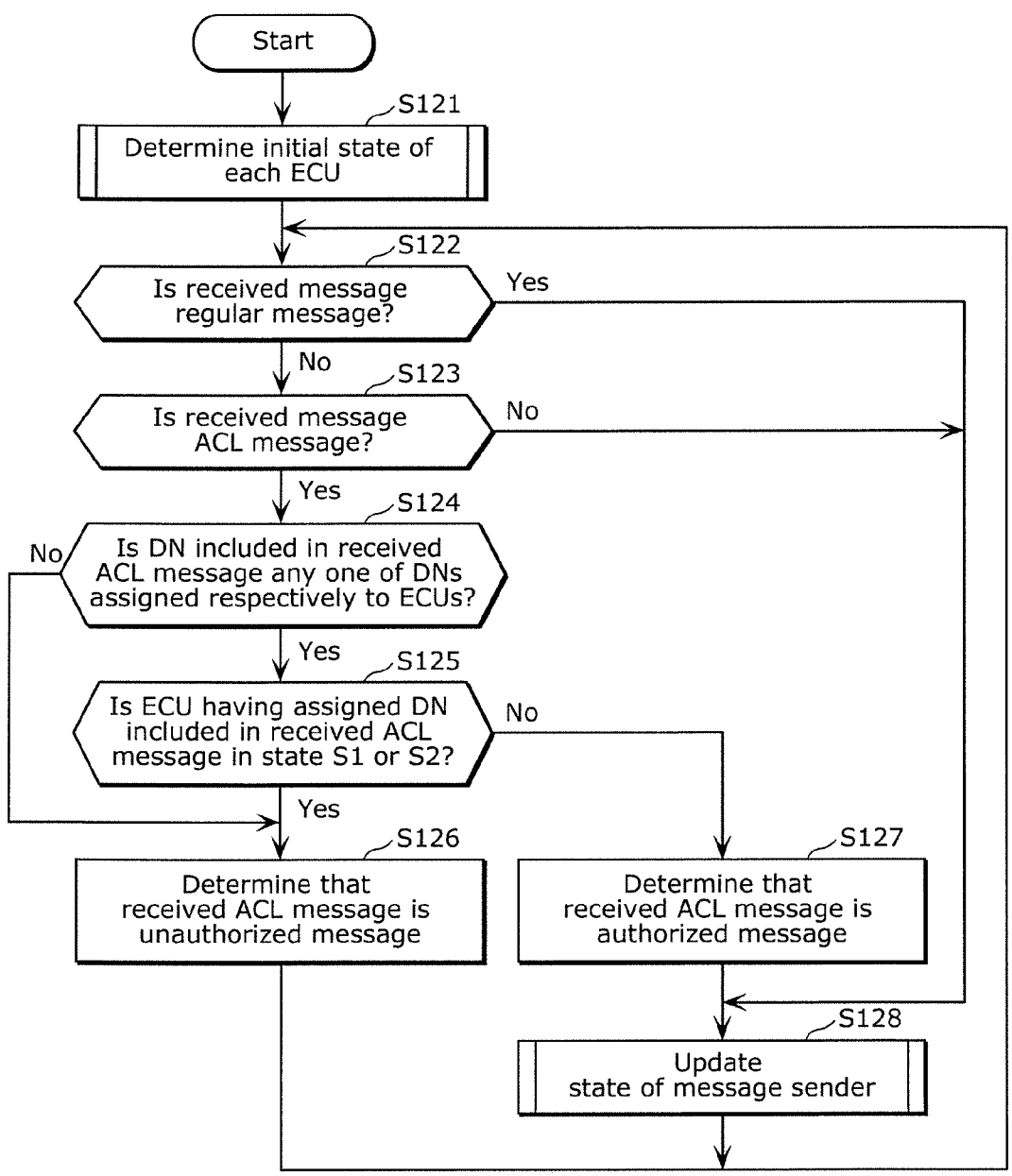
FIG. 13 is a flow chart illustrating one example of an operation performed by the electronic control unit according to Embodiment 2.

FIG. 13 is a flow chart indicating one example of an operation performed by an electronic control unit (anomaly detection ECU 200) according to Embodiment 2.

First, anomaly detection ECU 200 determines the initial states of ECUs 100a to 100g (Step S121). Details of Step S121 are described with reference to FIG. 14.

Figure 14:
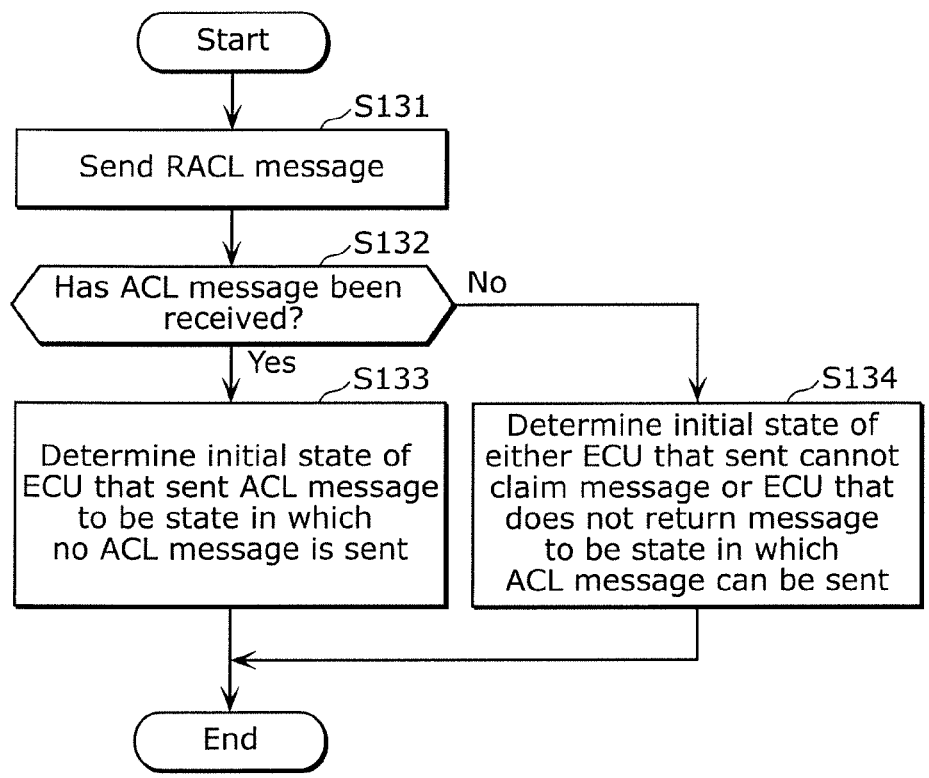
FIG. 14 is a flow chart illustrating a method for determining initial states of the other electronic control units.

FIG. 14 is a flow chart indicating a method for determining the initial states of the other ECUs 100a to 100g.

First, sending unit 205 sends an RACL message to CAN bus 300 when anomaly detection ECU 200 is booted up (Step S131). When a current ECU which received an RACL message among ECUs 100a to 100g has obtained an SA, the current ECU returns an ACL message including the obtained SA and its own DN. When the current ECU has not yet obtained an SA, the current ECU returns a cannot claim message including its own DN. In addition, ECUs which have not been booted up or are being initialized among ECUs 100a to 100g cannot receive the RACL message, and thus do not return anything.

Next, update unit 204 determines whether an ACL message has been received from any of ECUs 100a to 100g in response to the sent RACL message (Step S132).

In the case where update unit 204 has received an ACL message from any of ECUs 100a to 100g (Yes in Step S132), update unit 204 updates the initial state of the ECU assigned with the DN included in the received ACL message to a state in which no ACL message is sent (Step S133). More specifically, update unit 204 updates the initial state of the ECU to State S2. In the exemplary case indicated in FIG. 11, Na, Nc, Nf, and Ng as DNs are associated with State S2 and stored.

In the opposite case where update unit 204 has not received an ACL message from any of ECUs 100a to 100g (No in Step S132), for example, when a cannot claim message has been received in response to the sent RACL message, or when no message has been returned in response to the sent RACL message, the process in Step S134 is performed. In other words, when update unit 204 has received the cannot claim message in response to the sent RACL message, update unit 204 updates the initial state of the ECU assigned with the DN included in the received cannot claim message (that is, the ECU that sent the cannot claim message) to a state in which an ACL message can be sent. In addition, when no message has been returned in response to the sent RACL message, update unit 204 updates the initial state of each ECU which has not returned a message to a state in which an ACL message can be sent. More specifically, update unit 204 updates the initial state of each ECU to State S0. In the example indicated in FIG. 11, Nb as a DN is associated with State S0 and stored.

In this way, anomaly detection ECU 200 sends the RACL message firstly when being booted up, and determines the initial states of ECUs 100a to 100g according to the responses therefrom. Anomaly detection ECU 200 then monitors CAN bus 300.

Returning to the description with reference to FIG. 13, anomaly detection ECU 200 determines the initial states of ECUs 100a to 100g, and monitors messages that flow in CAN bus 300. First determination unit 201 determines whether each message received via CAN bus 300 is a regular message (Step S122). Messages received by communication interface 220 include regular messages or ACL-related messages relating to obtainment of SAs. Whether a received message is a regular message can be determined by first determination unit 201. When first determination unit 201 has determined that the received message is a regular message (Yes in Step S122), first determination unit 201 performs a process of updating the state of the sender of the message in Step S128. The state update processes in Step S128 are performed, for example, in the case where the answer is Yes in Step S122, in the case where the answer is No in Step S123 described later, and in the case where Step S127 was performed. Details of the state update processes vary according to the cases. The state update processes are described in detail with reference to FIG. 15 described later.

When first determination unit 201 has determined that the received message is not a regular message (No in Step S122), first determination unit 201 determines whether the received message is an ACL message (Step S123). When first determination unit 101 has determined that the received message is not an ACL message (No in Step S123), for example, when the received message is a cannot claim message or an RACL message, update unit 204 performs a process of updating the state of the sender of the message in Step S128.

When it has been determined that the received message is an ACL message by first determination unit 201 (Yes in Step S123), second determination unit 202 determines whether the DN included in the received ACL message is the predetermined DN. In Embodiment 2, the predetermined DN is any of the DNs assigned to the other ECUs 100a to 100g. In other words, second determination unit 102 determines whether the DN included in the received ACL message is any of the DNs (that is, any of Na to Ng) assigned respectively to the other ECUs 100a to 100g (Step S124). Anomaly detection ECU 200 manages DNs of ECUs 100a to 100g connected to CAN bus 300. Thus, upon reception of an ACL message including a DN different from any of the DNs of ECUs 100a to 100g, anomaly detection ECU 200 can recognize that none of ECUs 100a to 100g has not sent the ACL message and concludes that the ACL message was sent by an unauthorized ECU using the DN different from any of the DNs of ECUs 100a to 100g.

For this reason, when it has been determined that the DN included in the received ACL message is not any of the DNs assigned respectively to ECUs 100a to 100g by second determination unit 202 (No in Step S124), third determination unit 203 determines that the received ACL message is an unauthorized message (Step S126).

When it has been determined that the DN included in the received ACL message is any of the DNs assigned respectively to ECUs 100a to 100g by second determination unit 202 (Yes in Step S124), third determination unit 203 performs a predefined determination process. In Embodiment 2, third determination unit 203 determines, in the predefined determination process, whether the state of the ECU assigned with the DN included in the received ACL message is a state in which no ACL message is sent (that is, State S1 or State S2) (Step S125). Third determination unit 203 can determine whether the ECU is in State S1 or State S2 by checking the association between DNs and states stored in storage unit 230 as illustrated in FIG. 11.

When third determination unit 203 has determined that the ECU assigned with the DN included in the received ACL message is in a state in which no ACL message is sent (Yes in Step S125), third determination unit 203 determines whether the received ACL message is an unauthorized message (Step S126). In other words, when third determination unit 103 received the ACL message although the ECU assigned with the DN included in the received ACL message is in the state in which no ACL message is sent, third determination unit 103 can conclude that the ACL message was sent by an unauthorized ECU and the ACL message is an unauthorized message. In this way, anomaly detection ECU 200 is capable of preventing an attack of spoofing in which an unauthorized ECU pretends to be any one of ECUs 100a to 100g by abusing an ACL message or an attack of changing the SA of the one of ECUs 100a to 100g.

When third determination unit 203 has determined that the ECU assigned with the DN included in the received ACL message is not in a state in which no ACL message is sent, that is, in a state in which an ACL message can be sent (that is, State S0, S3, S4, or S5) (No in Step S125), third determination unit 203 determines that the received ACL message is an authorized message (Step S127). Such a determination has been made because, since the ECU is in the state in which an ACL message can be sent, it is possible to conclude that the ACL message received by anomaly detection ECU 200 was sent by the authorized ECU in the state in which the ACL message can be sent. Update unit 204 then performs a process of updating the state of the sender of the message in Step S128.

The state update process in Step S128 is described with reference to FIG. 15.

Figure 15:
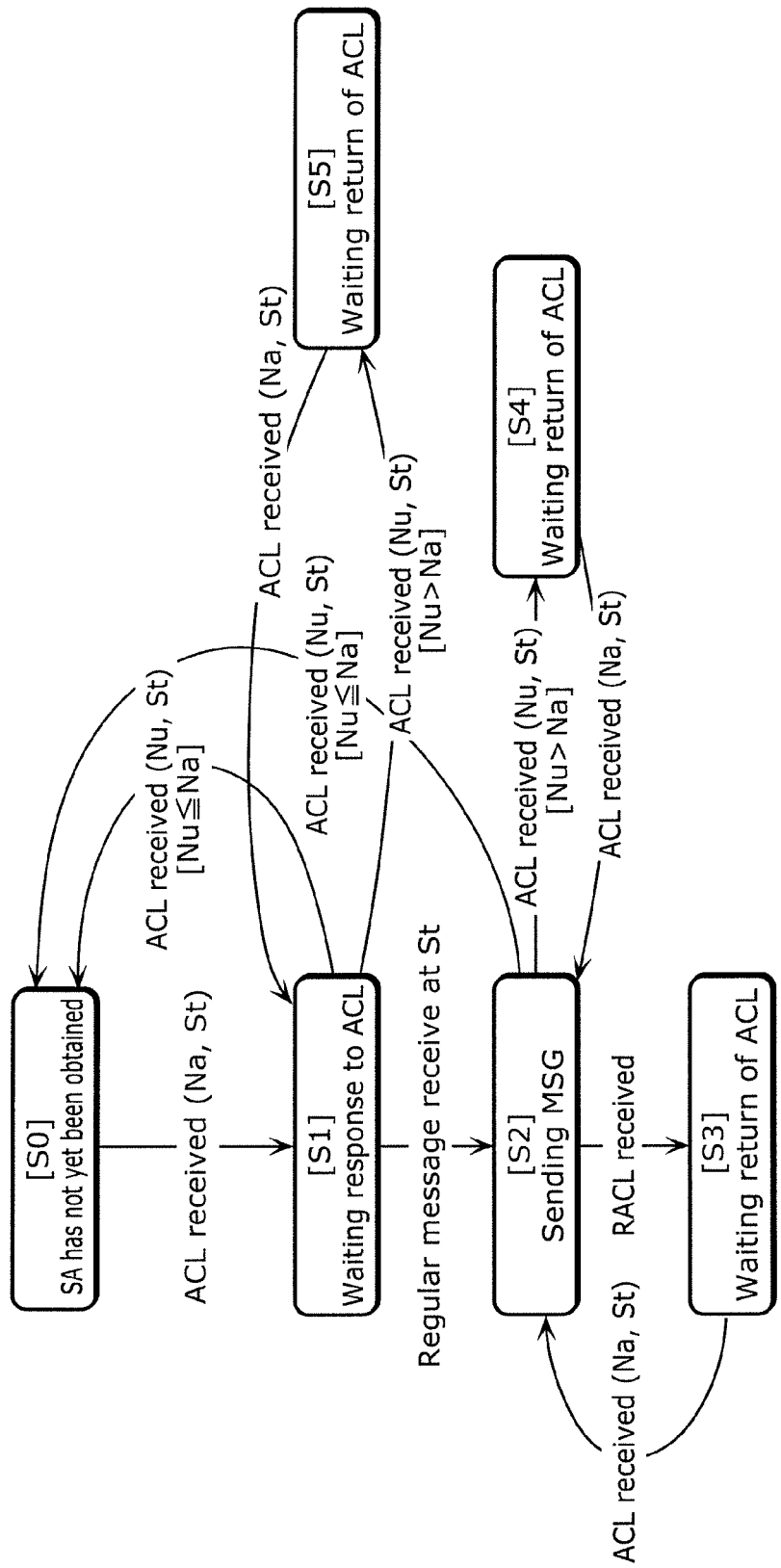
FIG. 15 is a diagram for explaining state transitions of a current one of the other electronic control units.

FIG. 15 is a diagram for describing the state transitions of an ECU. The state transitions are described focusing on the states of ECU 100a with reference to FIG. 15. In FIG. 15, (Na, St) indicates that Na as a DN and St as an SA are included in an ACL message. The statements of "ACL received", "RACL received", and "Regular message received" described in a manner overlapping with arrows that connect square frames in which characters are written mean that anomaly detection ECU 200 receives an ACL message, an RACL message, and a regular message via CAN bus 300.

For example, ECU 100a whose DN is Na is in State S0 (that is, State S0 is associated with Na as the DN in storage unit 230). ECU 100a is in a state in which an SA has not yet been obtained, thus ECU 100a sends an ACL message including Na as its DN and St as its SA when trying to obtain St as its SA. In this way, anomaly detection ECU 200 receives an ACL message including Na as its DN and St as its SA. The DN (that is, Na) included in the ACL message received by anomaly detection ECU 200 is the DN assigned to ECU 100a. Thus, in FIG. 13, the answer in Step S124 is Yes. ECU 100a assigned with the DN (that is, Na) included in the received ACL message is in State S0 as described above and is not in State S1 or S2. Thus, in FIG. 13, the answer in Step S125 is No. Through Step S127, the state update process of the sender of the message in Step S128 is performed.

When it has been determined that ECU 100a assigned with the DN included in the received ACL message is in a state in which an ACL message can be sent, update unit 204 updates the state of ECU 100a to a state in which no ACL message is sent. For example, when ECU 100a assigned with the DN included in the received ACL message is in State S0 in which an ACL message can be sent, update unit 204 updates the state of ECU 100a to State S1 in which no ACL message is sent. This update is performed because ECU 100a has sent the ACL message in order to obtain an SA, and is a state of waiting a response to the ACL message for 250 ms.

When ECU 100a has not received an ACL message from any of the other ECUs 100b to 100g in the period of 250 ms when ECU 100a is in State S1 (that is, when none of ECUs 100b to 100g returns an ACL message for expressing an objection to the obtainment of St as the SA by ECU 100a), ECU 100a starts to send a regular message including St as its SA. In this way, anomaly detection ECU 200 receives the regular message including St as the SA, the answer in Step S122 is Yes in FIG. 13, and the state update process in Step S128 is performed.

Update unit 204 can know that the SA included in the received regular message is St and ECU 100a has obtained St as its SA, and thus update unit 204 updates the state of ECU 100a from State S1 to State S2.

When one of the ECUs which has a higher priority level than ECU 100a (for example, the ECU assigned, as its DN, with Nu smaller than or equal to Na) expresses an objection to the obtainment of St as the SA by ECU 100a, the ECU having the higher priority level returns an ACL message including Nu as its DN and St as its SA. In this way, anomaly detection ECU 200 receives an ACL message including Nu as its DN and St as its SA and can recognize that ECU 100a has failed to obtain St as its SA, and thus anomaly detection ECU 200 updates the state of ECU 100a from State S1 to State S0. When Na and Nu are the same, it is to be noted that ECU 100a assigned with Na as its DN is in State S1, that is, in a state in which no ACL including Na (Nu) as its DN is sent in the first place, and thus anomaly detection ECU 200 can determine that the ACL message including Nu as its DN and St as its SA is an unauthorized message.

A given ECU may happen to be being initialized and may not be aware of the fact that ECU 100a has sent an ACL message in State S1. For example, the initialization of the given ECU may be completed and may send an ACL message including Nu as its DN and St as its SA before the state of one of the ECUs which has a lower priority level than that of ECU 100a (for example, the ECU assigned, as its DN, with Nu larger than Na) transits from State S1 to State S2 (that is, before ECU 100a starts sending of a regular message). In this way, anomaly detection ECU 200 receives the ACL message including Nu as its DN and St as its SA. Update unit 204 updates the state of ECU 100a from State S1 to State S5 because it can be concluded that ECU 100a has an objection to the ACL message and will send an ACL message again.

ECU 100a then sends an ACL message including Na as its DN and St as its SA. In this way, anomaly detection ECU 200 receives the ACL message including Na as the DN and St as the SA. The DN (that is, Na) included in the ACL message received by anomaly detection ECU 200 is the DN assigned to ECU 100a. Thus, in FIG. 13, the answer in Step S124 is Yes. ECU 100a assigned with the DN (that is, Na) included in the received ACL message is in State S5 and is not in State S1 or S2. Thus, in FIG. 13, the answer in Step S125 is No. Through Step S127, the state update process in Step S128 is performed. For example, when ECU 100a assigned with the DN included in the received ACL message is in State S5 in which an ACL message can be sent, update unit 204 updates the state of ECU 100a to State S1 in which no ACL message is sent.

One of the ECUs which has a higher priority level than that of ECU 100a (for example, the ECU assigned, as its DN, with Nu smaller than or equal to Na) may be booted up and may send an ACL message including Nu as its DN and St as its SA when ECU 100a is in State S2. In this way, anomaly detection ECU 200 receives an ACL message including Nu as the DN and St as the SA and can recognize that ECU 100a gives the ECU having the higher priority level St as its SA and that the state of ECU 100a is updated to a state in which an SA has not yet been obtained, and thus anomaly detection ECU 200 updates the state of ECU 100a from State S2 to State S0. When Na and Nu are the same, it is to be noted that ECU 100a assigned with Na as its DN is in State S2, that is, in a state in which no ACL including Na (Nu) as its DN is sent in the first place, and thus anomaly detection ECU 200 can determine that the ACL message including Nu as its DN and St as its SA is an unauthorized message.

One of the ECUs which has a lower priority level than that of ECU 100a (for example, the ECU assigned, as its DN, with Nu larger than Na) may be booted up and may send an ACL message including Nu as its DN and St as its SA when ECU 100a is in State S2. In this way, anomaly detection ECU 200 receives the ACL message including Nu as its DN and St as its SA. Update unit 204 updates the state of ECU 100a from State S2 to State S4 because it can be concluded that ECU 100a has an objection to the ACL message and will send an ACL message again.

ECU 100a then sends an ACL message including Na as its DN and St as its SA. In this way, anomaly detection ECU 200 receives the ACL message including Na as the DN and St as the SA. The DN (that is, Na) included in the ACL message received by anomaly detection ECU 200 is the DN assigned to ECU 100a. Thus, in FIG. 13, the answer in Step S124 is Yes. ECU 100a assigned with the DN (that is, Na) included in the received ACL message is in State S4 and is not in State S1 or S2. Thus, in FIG. 13, the answer in Step S125 is No. Through Step S127, the state update process in Step S128 is performed. For example, when ECU 100a assigned with the DN included in the received ACL message is in State S4 in which an ACL message can be sent, update unit 204 updates the state of ECU 100a to State S2 in which no ACL message is sent.

In addition, ECU 100a may receive an RACL message when ECU 100a is in State S2. In this case, anomaly detection ECU 200 also receives the RACL message in the same manner. In FIG. 13, first determination unit 201 determines whether the received message is an RACL message when the answer in Step S123 is No, and when it has been determined that the received message is an RACL message, update unit 204 updates the state of ECU 100a to a state in which an ACL message can be sent (specifically, State S3) in Step S128. This update is performed because it can be concluded that ECU 100a receives the RACL message and returns an ACL message in response to the RACL message.

ECU 100a then sends an ACL message including Na as its DN and St as its SA. In this way, anomaly detection ECU 200 receives the ACL message including Na as the DN and St as the SA. The DN (that is, Na) included in the ACL message received by anomaly detection ECU 200 is the DN assigned to ECU 100a. Thus, in FIG. 13, the answer in Step S124 is Yes. ECU 100a assigned with the DN (that is, Na) included in the received ACL message is in State S3 and is not in State S1 or S2. Thus, in FIG. 13, the answer in Step S125 is No. Through Step S127, the state update process in Step S128 is performed. For example, when ECU 100a assigned with the DN included in the received ACL message is in State S3 in which an ACL message can be sent, update unit 204 updates the state of ECU 100a to State S2 in which no ACL message is sent.

When anomaly detection ECU 200 receives an RACL message, it is to be noted that the other ECUs 100a to 100g receive the RACL message in addition to ECU 100a, and thus that update unit 204 updates the states of the other ECUs 100a to 100g to a state in which an ACL message can be sent when the received message is determined to be an RACL message.

2.4 Conclusion

As described above, anomaly detection ECU 200 in electronic control system 2 detects an anomaly made by abusing an ACL message in conformity with the SAE J1939 standard. More specifically, when anomaly detection ECU 200 receives an ACL message including the DN of any one of ECUs 100a to 100g although the one is in a state in which no ACL message is sent, anomaly detection ECU 200 determines that the ACL message is an unauthorized message. With anomaly detection ECU 200 according to Embodiment 2, no communication for authentication and key sharing is performed, and no delay due to such communication occurs. In addition, with anomaly detection ECU 200 according to Embodiment 2, no field for storing a MAC in a CAN message packet is necessary, and thus time required to send the message does not increase. Accordingly, with anomaly detection ECU 200 according to Embodiment 2, it is possible to detect an anomaly made by abusing an ACL message in conformity with the SAE J1939 standard while reducing deterioration in communication quality.

Effects Etc.

The electronic control unit (ECU 100 in Embodiment 1, anomaly detection ECU 200 in Embodiment 2) sends and receives a message to and from one or more other electronic control units (other ECUs 100 in Embodiment 1, other ECUs 100a to 100g in Embodiment 2) via CAN bus 300, based on the SAE J1939 standard. The ECU includes: a first determination unit which determines whether a message received is an ACL message; a second determination unit which determines, when it is determined that the message received is an ACL message, whether a DN included in the ACL message received is a predetermined DN; and a third determination unit which performs a predefined determination process, when it is determined that the DN included in the ACL message received is the predetermined DN, and determines whether the ACL message received is an unauthorized message according to a result of the predefined determination process.

In addition, each of electronic control systems 1 and 2 includes the above electronic control unit, the above one or more other electronic control units, and CAN bus 300.

With this, the electronic control unit is capable of determining whether the received ACL message includes the predetermined DN, and when the received ACL message includes the predetermined DN, determining whether the received ACL message is the unauthorized message only by performing the predefined determination process. In other words, it is possible to detect the anomaly made by abusing the ACL message in conformity with the SAE J1939 standard while reducing deterioration in communication quality because no communication for authentication and key sharing is performed and no delay due to such communication occurs, no field for storing a MAC in a CAN message packet is necessary, and time required to send a message does not increase.

In addition, in Embodiment 1, the predetermined DN may be a DN assigned to current ECU 100, third determination unit 103 may: determine, in the predefined determination process, whether the ACL message received is a message sent by current ECU 100; and determine that the ACL message received is an unauthorized message when the ACL message received is not a message sent by current ECU 100.

According to this, when current ECU 100 has received the ACL message including its DN although current ECU 100 did not send the ACL message, current ECU 100 can determine that the ACL message is the unauthorized message.

The following corresponds to Embodiment 2.

The predetermined DN may be a DN among predetermined DNs assigned respectively to the other ECUs 100a to 100g. Third determination unit 203 may: determine, in the predefined determination process, whether the DN included in the ACL message received is one of the DNs assigned respectively to the other ECUs 100a to 100g; and determine that the ACL message received is the unauthorized message when it is determined that the DN included in the ACL message received is not any one of the DNs assigned respectively to the other ECUs 100a to 100g.

According to this, when anomaly detection ECU 200 has received the ACL message including a DN which is not any one of the DNs of ECUs 100a to 100g connected to CAN bus 300, anomaly detection ECU 100 can conclude that the ACL message was sent by the unauthorized ECU or the like, and thus can determine that the ACL message is the unauthorized message.

In addition, third determination unit 203 may: determine, in the predefined determination process, whether the other ECU which is assigned with the DN included in the ACL message received is in a state in which no ACL message is sent; and determine that the ACL message received is an unauthorized message when it is determined that the ECU assigned with the DN included in the ACL message received is in the state in which no ACL message is sent.

According to this, anomaly detection ECU 200 can determine that the ACL message is the unauthorized message when the ACL message including the DN of one of the other ECU 100a to 100g was received although the one is in a state in which no ACL message is sent.

In addition, anomaly detection ECU 200 may include: storage unit 230 which stores states of the other one or more ECUs 100a to 100g; and update unit 204 which updates the states of the one or more other ECUs 100a to 100g stored in storage unit 230.

According to this, anomaly detection ECU 200 can store the states of the other ECUs 100a to 100g and update the states according to circumstances.

In addition, update unit 204 may update the state of the other ECU assigned with the DN included in the ACL message received to the state in which no ACL message is sent, when it is determined that the other ECU is in a state in which an ACL message can be sent.

According to this, when anomaly detection ECU 200 received the ACL message from the ECU in the state in which an ACL message can be sent, the state of the ECU can be updated to a state in which no ACL message is sent because the ECU sent the ACL message and is currently in a state in which no ACL message is sent.

In addition, first determination unit 201 may further determine whether the message received is an RACL message, and update unit 204 may update the states of the one or more other ECUs 100a to 100g to the state in which an ACL message can be sent, when it is determined that the message received is an RACL message.

According to this, when anomaly detection ECU 200 received the RACL message, the other ECUs 100a to 100g are in a state in which an ACL message is about to be returned in response to the RACL message, and thus the states of the other ECUs 100a to 100g can be updated to a state in which an ACL message can be sent.

In addition, anomaly detection ECU 200 may further include: sending unit 205 which sends an RACL message to CAN bus 300 when anomaly detection ECU 200 is booted up. Update unit 204 may: determine, when an ACL message is received in response to the RACL message sent, that an initial state of the other ECU assigned with the DN included in the ACL message received is the state in which no ACL message is sent; determine, when a cannot claim message is received in response to the RACL message sent, that the initial state of the other ECU assigned with the DN included in the ACL message received is the state in which an ACL message can be sent; and determine that an initial state of an ECU which does not send a message in response to the RACL massage received is the state in which an ACL message can be sent.

According to this, anomaly detection ECU 200 sends the RACL message when being booted up, and can determine the initial states of the other ECUs 100a to 100g according to the returns from the other ECUs 100a to 100g.

Other Embodiment 1

As described above, embodiments have been given as exemplary techniques according to the present disclosure. However, techniques according to the present disclosure are not limited thereto, and are applicable to embodiments obtained by arbitrarily performing modification, replacement, addition, and omission on the techniques disclosed herein. For example, the following variations are also included in one embodiment of the present disclosure.

For example, in Embodiment 1, each of ECUs 100 (ECUs 100a to 100g) in electronic control system 1 includes anomaly detection unit 110 which is a unique element of the present disclosure. However, this is a non-limiting example. For example, an ECU which does not include anomaly detection unit 110 may be connected to CAN bus 300 in electronic control system 1.

In addition, for example, in Embodiment 2, anomaly detection ECU 200 includes sending unit 205 which sends an RACL message to CAN bus 300 when being booted up. However, this is a non-limiting example.

In addition, for example, in Embodiments 1 and 2, each of electronic control systems 1 and 2 includes seven ECUs 100a to 100g. However, it is only necessary that each electronic control system include at least two ECUs.

In addition, for example, in each of Embodiments 1 and 2, a most significant 1-bit Arbitrary Address Capable (AAC) in a DN of an ECU is a bit for the ACL protocol, and thus is not used to identify the ECU. Thus, there is no need to consider the value of the AAC in the comparison between values indicated by DNs. In other words, the comparison between the DNs are made using the values indicated by all the bits (64 bits) in the DNs in Embodiments 1 and 2, but the comparison between the DNs may be made using values indicated by the least significant 63 bits excluding the bit for the AAC among the 64 bits.

In addition, for example, the electronic control unit may include an output unit which outputs a result of a determination as to whether a received ACL message is an unauthorized message to the other one or more ECUs in the electronic control system or a device (for example, a server device, or the like) outside the electronic control system.

It is to be noted that the present disclosure can be implemented as not only an electronic control unit but also an electronic control method including the steps (processes) performed by the respective elements of the electronic control unit.

For example, the steps of the electronic control method may be executed by a computer (computer system). Furthermore, the present disclosure can be implemented as a program for causing a computer to execute the steps of the electronic control method.

Figure 16:
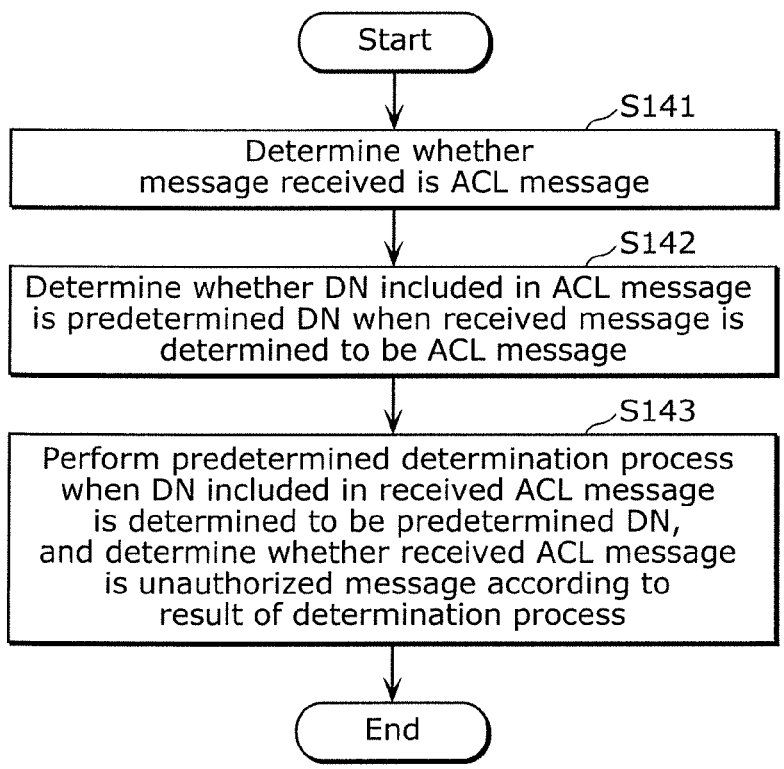
FIG. 16 is a flow chart indicating steps executed by a program according to another embodiment being executed by an electronic control unit.

FIG. 16 is a flow chart indicating steps executed by a program according to another embodiment being executed by an electronic control unit.

The program is a program which is executed by an electronic control unit which sends and receives a message to and from one or more other electronic control units via a CAN bus according to the SAE J1939 standard, and includes: a first determination process for determining whether a message received is an ACL message (Step S141); a second determination process for determining, when it is determined that the message received is an address claim message, whether a device name included in the address claim message received is a predetermined device name (Step S142); and a third determination process for performing a predefined determination process, when it is determined that the device name included in the address claim message received is the predetermined device name, and determining whether the address claim message received is an unauthorized message according to a result of the predefined determination process (Step S143).

Furthermore, the present disclosure can be implemented as a non-transitory computer-readable recording medium such as a CD-ROM having the program recorded thereon.

For example, when the present disclosure is implemented as a program (software item), the steps are executed by means of the program being executed using hardware resources such as a CPU of a computer, a memory, an input/output circuit, etc. In other words, the steps are executed by means of, for example, the CPU obtaining data from the memory or the input/output circuit etc., and computing, and outputting the computation result to the memory or the input/output circuit etc.

Each of the elements included in the electronic control units according to the above embodiments may be implemented as an exclusive or general purpose circuit.

Each of the elements included in the electronic control units according to the above embodiments may be implemented as a large scale integration (LSI) which is an integrated circuit (IC).

The integrated circuit is not limited to the LSI, and may be implemented as an exclusive or general purpose processor. It is also possible to use a field programmable gate array (FPGA) that is programmable or a reconfigurable processor in which connections and settings of circuit cells within the LSI are reconfigurable.

Furthermore, when a circuit integration technology for replacing LSIs with new circuits appears in the future with advancement in semiconductor technology and derivative other technologies, the circuit integration technology may be naturally used to integrate the elements included in the electronic control units.

In addition, the present disclosure covers embodiments which can be obtained by adding, to the embodiments, various kinds of modifications that would be arrived at by a person skilled in the art and embodiments which can be implemented by arbitrarily combining the constituent elements and functions in the embodiments within the scope of the present disclosure.

INDUSTRIAL APPLICABILITY

The present disclosure is applicable to, for example, tracks, buses, vehicles for construction, tractors, trailers, etc.

The invention claimed is:

1. An electronic control unit which sends and receives a message to and from one or more other electronic control units via a Controller Area Network (CAN) bus, the electronic control unit comprising:
    a memory including a control program and configured to store one or more states of the one or more other electronic control units; and a processor configured to operate according to the control program and, when operating according to the control program, the processor is configured to:
  determine whether a received message is an address claim message;
  determine, when the received message is the address claim message, whether a device name included in the address claim message is a predetermined device name;
  perform a predefined determination process, when the device name included in the address claim message is the predetermined device name, and determine whether the address claim message is an unauthorized message according to a result of the predefined determination process; and
  update the one or more states of the one or more other electronic control units stored in the memory,
wherein the predetermined device name is one of predetermined device names assigned respectively to the one or more other electronic control units,
in the predefined determination process, the processor determines whether the device name included in the address claim message is one of the predetermined device names assigned respectively to the one or more other electronic control units,
the processor determines that the address claim message is the unauthorized message when the device name included in the address claim message is not any one of the predetermined device names assigned respectively to the one or more other electronic control units, and
when the device name included in the address claim message is one of the predetermined device names assigned to an other electronic control unit from among the one or more other electronic control units:
  in the predefined determination process, the processor further determines whether the other electronic control unit which is assigned the device name included in the address claim message is in a state in which no address claim message is sent;
  the processor determines that the address claim message is the unauthorized message when the other electronic control unit which is assigned the device name included in the address claim message is in the state in which no address claim message is sent, and
  the processor updates the state of the other electronic control unit which is assigned the device name included in the address claim message to the state in which no address claim message is sent, when the processor determines that the other electronic control unit is in a state in which the address claim message can be sent.

2. The electronic control unit according to claim 1, wherein the processor is configured to further determine whether the received message is a request for address claim message, and
the processor is configured to update the one or more states of the one or more other electronic control units to the state in which the address claim message can be sent, when the processor determines that the received message is the request for address claim message.

3. The electronic control unit according to claim 1, wherein the processor is further configured to send a request for address claim message to the CAN bus when the electronic control unit is booted up,
the processor is configured to determine, when the address claim message is received in response to the request for address claim message being sent and the device name included in the address claim message is assigned to the other electronic control unit, that an initial state of the other electronic control unit which is assigned the device name included in the address claim message is the state in which no address claim message is sent;
the processor is configured to determine, when a cannot claim message is received in response to the request for address claim message being sent and the device name included in the address claim message is assigned to the other electronic control unit, that the initial state of the other electronic control unit which is assigned the device name included in the address claim message is the state in which the address claim message can be sent; and
determine that an initial state of an electronic control unit which does not send a message in response to the request for address claim message is the state in which the address claim message can be sent.

4. An electronic control system, comprising:
the electronic control unit according to claim 1;
the one or more other electronic control units according to claim 1; and
the Controller Area Network (CAN) bus according to claim 1.

5. A non-transitory computer-readable recording medium having a program recorded thereon, the program, when executed by an electronic control unit which sends and receives a message to and from one or more other electronic control units via a Controller Area Network (CAN) bus, causing the electronic control unit to execute operations, the electronic control unit including a memory and a processor, the memory configured to store one or more states of the one or more other electronic control units, the processor configured to operate according to the program, the operations comprising:
  storing, in the memory, the one or more states of the one or more other electronic control units;
  determining whether a received message is an address claim message;
  determining, when the received message is the address claim message, whether a device name included in the address claim message is a predetermined device name; and
  performing a predefined determination process, when the device name included in the address claim message is the predetermined device name, and determining whether the address claim message is an unauthorized message according to a result of the predefined determination process; and
  updating the one or more states of the one or more other electronic control units stored in the memory,
wherein the predetermined device name is one of predetermined device names assigned respectively to the one or more other electronic control units,
in the predefined determination process, the electronic control unit determines whether the device name included in the address claim message is one of the predetermined device names assigned respectively to the one or more other electronic control units,
the electronic control unit determines that the address claim message is the unauthorized message when the device name included in the address claim message is not any one of the predetermined device names assigned respectively to the one or more other electronic control units, and when the device name included in the address claim message is one of the predetermined device names assigned to an other electronic control unit from among the one or more other electronic control units:
in the predefined determination process, the electronic control unit further determines whether the other electronic control unit which is assigned the device name included in the address claim message is in a state in which no address claim message is sent;
the electronic control unit determines that the address claim message is the unauthorized message when the other electronic control unit which is assigned the device name included in the address claim message is in the state in which no address claim message is sent, and
the electronic control unit updates the state of the other electronic control unit which is assigned the device name included in the address claim message to the state in which no address claim message is sent, when the electronic control unit determines that the other electronic control unit is in a state in which the address claim message can be sent.

* * * * *